United States Patent [19]

Ellslager

[11] 4,306,994
[45] Dec. 22, 1981

[54] ANTI-STICKING COMPOSITION FOR COATING UNVULCANIZED RUBBER

[75] Inventor: William M. Ellslager, South Euclid, Ohio

[73] Assignee: Kalcor Coatings Company, Incorporated, Willoughby, Ohio

[21] Appl. No.: 134,424

[22] Filed: Mar. 27, 1980

[51] Int. Cl.$^3$ ............................................. C09K 3/100
[52] U.S. Cl. .................................... 252/382; 252/383; 252/384; 252/385; 106/287.17
[58] Field of Search ...................... 106/287.17, 287.29, 106/DIG. 4, 2; 252/535, 140, 382, 383

[56] References Cited

U.S. PATENT DOCUMENTS

| | | | |
|---|---|---|---|
| 1,943,519 | 1/1934 | Denning | 252/131 |
| 2,120,526 | 6/1938 | Owen | 164/72 |
| 2,147,312 | 2/1939 | Partridge | 106/287 |
| 2,210,177 | 8/1940 | Rader | 152/330 |
| 2,248,636 | 7/1941 | Marsden | 428/220 |
| 2,586,211 | 2/1952 | Currie | 106/38.22 |
| 3,474,166 | 10/1969 | Babcock | 264/338 |
| 3,519,444 | 7/1970 | Brown et al. | 106/38.24 |
| 3,765,911 | 10/1973 | Knowles | 106/2 |
| 3,990,990 | 11/1976 | Kojima | 252/382 |

OTHER PUBLICATIONS

Schwartz, Perry, Berch, "Surface Active Agents and Detergents", vol. II, 1958, pp. 293–294.

*Primary Examiner*—Allan Lieberman
*Assistant Examiner*—P. Short
*Attorney, Agent, or Firm*—Milton Zucker

[57] ABSTRACT

A dry composition is described which can be converted to an anti-sticking composition for unvulcanized rubber by dispersion in water, consisting essentially of a film forming clay (bentonite or attapulgite), a surfactant and an additive capable of inactivating calcium and magnesium ions (e.g. polyphosphate); optionally, there may be present a defoamer, and up to equal parts by volume, based on a film forming clay, of a filler to speed drying.

5 Claims, No Drawings

ANTI-STICKING COMPOSITION FOR COATING UNVULCANIZED RUBBER

BACKGROUND OF THE INVENTION

1. Field of the Invention

This invention relates to compositions for coating unvulcanized rubber to prevent adhesion of slabs and/or pellets of such rubber to each other, and aims to provide such compositions which are inexpensive, are easy to apply, produce rapid-drying-non-dusting to lightly dusting films, and which have no harmful effects on the compounded rubber when incorporated into finished products.

2. The Prior Art

Unvulcanized rubber stock is ordinarily used in the forms of slabs which can be handled by an operator. These slabs or pellets will adhere strongly to one another when piled up in heaps, and it is necessary to interpose a non-adhesive film or coating between the slabs or pellets, to prevent this adhesion. Because interposed fabric or plastic film are both expensive and messy to handle, it has been customary to coat the rubber slabs with some material which will form a film or coating on the rubber stock which will prevent this adhesion. The most common materials used are powders, applied as such, or more commonly as aqueous slurries; the powdery deposit left on the rubber spaces the slabs apart, and prevents any adhesive rubber-to-rubber bond from being continuous enough to seriously retard separation of the slabs. Materials such as zinc stearate and mica, widely used in the past, have been generally superseded by kaolin, mainly for cost reasons. The kaolins are generally applied as aqueous slurries in water containing some surfactant, to permit ready spreading of the kaolin particles over the unvulcanized rubber surface.

Two serious problems exist with such materials. Most important, serious dust problems occur in the work areas adjacent the rubber, both in storage and in working up of the rubber in the mills in which they are compounded with other materials. Additionally, aqueous kaolin dispersions tend to settle out, so that the suspensions used to coat the rubber must be stirred regularly to keep them reasonably uniform in composition.

Attempts to improve on aqueous dispersions of Kaolin or other powders have been unattractive for a variety of reasons. Cost is probably the principal cause for rejection of alternatives. Additional reasons are failures to solve the dusting problem, incompatibility with the intended use of the rubber, difficulty in use, or inability to cope with variations in local water supply or rubber stock.

STATEMENT OF THE INVENTION

I have prepared a dry composition which is readily dispersable in water from most all conventional sources which are encountered in the United States rubber industry, which is useful on substantially all unvulcanized rubber stocks and produces a non-dusting to very low dusting film which is effective in preventing adhesion, while at the same time producing a low to minimal settling aqueous dispersion which does not need constant stirring in use, shows little foaming, and is storage stable. My compositions are based on a film forming clay of the class consisting of alkali metal bentonites, and attapulgites, together with minor quantities of an anionic or nonionic surfactant, together with similar small quantities of a chemical capable of inactivating calcium and magnesium ions in aqueous solutions thereof. Optionally, a small amount of a non-silicone defoamer may be included. To speed drying this may be blended with up to equal parts by pigment volume, based on the film forming clay, of a wet filler such as kaolin, calcium carbonate or other inexpensive fine powder. The dry powder is shipped as such, and can be readily mixed with water to form a flowable composition which spreads readily, as by dipping, flow coating, or spraying, on unvulcanized rubber surfaces, to form a film on the rubber which dries rapidly to form an effective inexpensive anti-sticking layer.

DETAILED DESCRIPTION OF THE INVENTION

It is known that certain clays will swell in water to form dispersions which form fairly continuous films. The alkali bentonites, which are found naturally in Wyoming, are known to be effective film formers, and are the preferred basic ingredients of my compositions. Aqueous attapulgite dispersions also form films which are somewhat less well defined than bentonite films, but can be used in the practise of my invention. Calcium bentonites are not effective although they can be converted to the sodium form and then used.

Aqueous bentonites suspensions, while useful for example in coating molds for the plastic industry, are not useful as such in the treatment of unvulcanized rubber slabs to prevent sticking; they do not wet the surface uniformly. Rubber stocks vary widely in their surface properties, some being wet rather easily by such aqueous bentonite-surfactant systems, others being difficult to wet. I have also found that the waters used in preparing such systems play an important role in the properties of the dispersions, varying widely in their effect.

I have found that uniformly good wetting of the rubber, over the range of rubber stocks and different waters used in the industry, can be obtained by adding to the film-forming clay-surfactant mixtures, a material capable of inactivating the calcium and magnesium ions in the added water. Such materials are widely used in the synthetic detergent industry, and are called "builders". The most common builders are the alkali metal polyphosphates—e.g. sodium and potassium tripolyphosphate, tri-sodium phosphate, sodium hexameta phosphate. Sodium borate (borax) is excellent. The sodium silicates and sodium carbonate are also effective in inactivating calcium and magnesium ions. Organic complexing agents (e.g.—nitrilo tri-acetic acid) and zeolites and similar ion-exchange materials, are also effective.

The surfactant may be any anionic or nonionic surfactant. However, they vary considerably in cost effectiveness, since surfactants tend to be absorbed onto the film forming clay and be inactivated, depending on their nature. Sodium dioctyl sulfosuccinate is the most cost effective of the surfactants I have examined.

I have found that any of the water dispersible nonionic and anionic surfactants will work, but their cost effectiveness of those I have tested is somewhat too substantially less than the sulfosuccinate. Surfactants tested include Na (bis) tridecyl sulfosuccinate, N-coco-aminobutyric acid, Na N-coco-B-amino propionate, Coco-FA 1:1 diethanolamide, Na lauryl sulfate, Na linear alkyl aryl sulfonates, the NH4 salt of styrenemaleic anhydride copolymer, various block polymers of ethylene and propylene oxide, the trimethyl nonyl ether of polyetheylene glycol, and various nonyl phenoxy poly (etheylene oxy) ethanols containing from 4 to 50 mols of etheylene oxide.

The amounts of the various materials added to the film forming clay depends on their exact nature. I use about 1% to 5% surfactant, based on the weight of film forming clay. Somewhat more can be used, but is expensive, and can induce foaming, with the resultant need for adding extra defoamer-again an expense. The calcium-magnesium inactivating chemical is generally present from an amount about equal to that of the surfactant, up to about 5 times the quantity of surfactant, again depending on the exact materials used. Somewhat larger quantities are again not harmful, but add unnecessary cost to the compositions.

If desired, an anti-foaming agent may be added to the composition. I prefer to use compositions based on finely divided silica, surface treated to be very hydrophobic. Such defoamers are available commercially from a number of sources. Typical defoamers of this type are described in U.S. Pat. No. 3,076,768 issued Feb. 9, 1963. Very small quantities are used—a fraction of a percent of active material is sufficient.

These compositions, when diluted with water to proper consistency (of the order of 20 to 25 parts by weight water to 1 of composition) yield flowable coating compositions which can be applied to unvulcanized rubber slabs, by dipping or spraying, to obtain an even film which, after drying, are substantially non-dusting, and effective to prevent adhesion of one rubber slab to another.

In some locations, where drying conditions are not good, an increase in drying speed is desirable. In such cases, I can increase drying speed by incorporating into the dry composition an inert filler, in amounts up to equal parts by volume of filler to film forming clay. Such additions give quicker drying films, at the cost of the introduction of relatively minor dusting. If more filler is used than film forming clay, the dusting may become objectionable, so that the use of more filler should be avoided.

On a cost basis, the best filler is kaolin. Other inexpensive fillers include talc, calcium carbonate and silica.

My compositions have the marked advantage over ordinary aqueous kaolin dispersions, or dispersions of other powders, that dusting is substantially eliminated in the case of compositions without added filler, and reduced to a minor problem when filler is added to speed drying. In addition, the compositions are very slow settling, so that agitation can be restricted to startup, and need not be continued during normal shift operations. The compositions additionally are inexpensive, and the residue left on the rubber stock are compatible with the rubber in future compounding.

SPECIFIC EXAMPLES OF THE INVENTION

The following examples are by way of illustration, and not by way of limitation:

EXAMPLE 1

Sodium bentonite product

| 49.0 | pounds | Wyoming bentonite (a natural Na bentonite) |
| 3.2 | pounds | Sodium hexametaphosphate |
| 1.3 | pounds | Sodium dioctyl sulfosuccinate |
| | | (70% active or 0.91 lbs. active material) |
| 1.3 | pounds | Defoamer (5-10% dispersion of hydrophobe-finely divided silica in mineral oil plus surfactants as in Example 1 of U.S. PAT. NO. 3,076,788) | are blended on a rubber blender to produce a dry composition. The powdery mixture requires stirring into about 150 gallons of water to produce a composition which forms an effective anti-adhesive coating for unvulcanized or green rubber slabs, which after drying is non-dusting, and is non-settling during use.

EXAMPLE 2

Attapulgite product

Example 1 was repeated, using attapulgite clay in place of the bentonite. Results obtained were comparable, except that on overnight standing, the aqueous dispersion settled out more than in Example 1. However, it could be stirred up with relative ease, and was satisfactory during operations.

EXAMPLE 3

Example 1 was repeated, adding 45 pounds to the formula shown. The film resulting from the dispersion of the product in 280 gallons water dried substantially more rapidly than films produced with the product of Example 1. However, overnight settling increased somewhat, although the product did not settle during normal use. The principal disadvantage of the addition was that the dried films tended to dust, although much less than similar kaolin films deposited without bentonite.

Additional kaolin over the amount used in this example produces progressively more dusting, and should be avoided.

EXAMPLE 4

Filler tests

In order to test other variants of the materials used, I prepared laboratory samples of aqueous compositions directly, and tested them on sensitized rubber stock. Green rubber pieces were scrubbed with soap and water, and wiped with a paper towel saturated with toluene, leaving an extremely sticky hydrophobic rubber. The pieces were coated by dipping, and allowed to dry; sticking was tested by placing pieces next to one another with sufficient weight on them to simulate plant conditions, and placing them overnight in an oven at 120° F. This test was used in all the examples which follow:

The basic formula used in these tests was:

| 150 | grams | tap water |
| 3.4 | grams | sodium hexametaphosphate |
| 0.14 | grams | active sodium dioctyl sulfosuccinate |
| 6.0 | grams | Wyoming bentonite |
| 0.03 | grams | defoamer of Example 1 |

In a series of tests, the bentonite was wholly replaced by attapulgite, talc, kaolin, precipitated calcium carbonate, and various finely divided synthetic silicas; in a second series, only half the bentonite was replaced.

In the first series, only the bentonite, attapulgite and two of these synthetic silicas passed the release test; and none of the compositions, except those made with bentonite and attapulgite, were satisfactory as to settling. Moreover, all the samples except those made with bentonite and attapulgite, showed undesirable dusting.

In the second series, using half bentonite and half non-film forming fillers, the compositions showed satisfactory settling characteristics, and the coated dried rubber pieces showed good to excellent release, along with noticeable dusting which was, however, substantially less than the same fillers without bentonite.

EXAMPLE 5

| | | |
|---|---|---|
| 80 | grams | tap water |
| 70 | grams | of an 8% dispersion of bentonite in tap water |
| 1.5 | grams | of an aqueous solution of sodium dioctyl sulfosuccinate containing 10% active surfactant |
| 0.15 | grams | of the defoamer of Example 1 |
| 3.75 | grams | of a 10% aqueous solution of an inactivator for calcium and magnesium ions | were blended and tested, using the following inactivators:

Borax (10% solution as $Na_2B_4O_7 \cdot 10 H_2O$)
Sodium silicate ($SiO_2/Na_2O$ ratio=3.22)
Sodium silicate ($SiO_2/Na_2O$ ratio=2.0)
Potassium tri-polyphosphate
Tetra potassium pyrophosphate
Sodium tri-polyphosphate
Tri-sodium phosphate
Sodium carbonate All gave satisfactory results, the borax composition being somewhat superior to that of Example 1 in settling. The release properties with sodium carbonate were somewhat marginal with the treated rubber used in the test, but would be generally satisfactory.

EXAMPLE 6

Example 4 was repeated, replacing the sodium dioctyl sulfosuccinate with a series of anionic and non-ionic surfactants, adjusting the amount of surfactant to get equivalent properties. The following surfactants were tested:

1. Monawet MO-70E Mona Industries 70% Na dioctyl sulfosuccinate
2. Aerosol OT-75 American Cyanamid 75% Na dioctyl sulfosuccinate
3. Emcol 4500 Witco Chemical 80% Na dioctyl sulfosuccinate
4. Emcol 4560 Witco Chemical 90% modified Na dioctyl sulfosuccinate
5. Emcol 4600 Witco Chemical 80% Na(bis) tridecyl sulfosuccinate
6. Armeen Armak 51-55% N-coco aminobutyric acid
7. Deriphat 151 General Mills 97% Na N-coco B aminopropionate
8. Monamid 150 Add Mona Industries 86% amide FA 1:1 coco diethanolamide
9. Lakeway 101-165B Lakeway Chemical 90% Na lauryl sulfate
10. Sulframin 90 Witco Chemical 90% Na linear alkyl aryl sulfonate
11. SMA-1440 Sinclair Petrochem 31% $NH_4$ salt of styrene malaeic anhydride copolymer
12. Pluronic F-68 BASF Wyandotte 100% Block polymers (ethylene oxide and propylene oxide)
13. Pluronic F-108 BASF Wyandotte 100% Block polymers (ethylene oxide and propylene oxide)
14. Tergitol TMN-10 Union Carbide 90% Trimethyl nonyl ether of polyethylene glycol (10 moles ethylene oxide)
15. Igepal CO 430 General Aniline & Film 100% Nonylphenoxy poly (ethylene-oxy) ethanol (4 moles ethylene oxide)
16. Igepal CO 530 General Aniline & Film 100% Nonylphenoxy poly (ethylene-oxy) ethanol (6 moles ethylene oxide)
17. Igepal CO 970 General Aniline & Film 100% Nonylphenoxy poly (ethylene oxy) ethanol (50 moles ethylene oxide)
18. Surfonic N-130 Jefferson Chemicals 100% Nonylphenoxy poly (ethylene oxy) ethanol (15 moles ethylene oxide)

All of the surfactants give satisfactory compositions when sufficient was added to insure wetting of the rubber surface. However, on the basis of cost effectiveness, sodium dioctyl sulfosuccinate (Nos. 1, 2, and 3) was the surfactant of choice.

EXAMPLE 7

Example 4 was repeated, eliminating the defoamer. With the bentonite formulation, slight foaming occured, although the composition could be satisfactory for most users.

When the bentonite was replaced by attapulgite, there was no foaming.

Both compositions gave satisfactory results as to settling and adhesion.

Obviously, the examples can be multiplied indefinitely, without departing from the invention, which is defined in the claims.

I claim:

1. A dry composition readily dispersible in water to form a coating which can be applied to pellets or slabs of unvulcanized rubber stock to form a non-dusting to low dusting film which is effective in preventing adhesion of the slabs to one another, consisting essentially of a film forming clay of the class consisting of alkali metal bentonites and attapulgite, from 1 to 5% by weight, based on the film forming clay, of an anionic or non-ionic surfactant together with a material capable of inactivating calcium and magnesium ions, in quantity by weight from one to five times that of the surfactant, and from 0 to equal parts by volume, based on the film forming clay, of an inert filler.

2. The composition of claim 1, which also contains a minor quantity of a non-silicone defoamer.

3. The composition of claim 1, in which the inert filler is kaolin.

4. The composition of claim 1, in which the surfactant is sodium dioctyl sulfosuccinate.

5. The composition of claim 1, when diluted with water to coating consistency.

* * * * *